(12) United States Patent
Heil et al.

(10) Patent No.: US 8,296,547 B2
(45) Date of Patent: Oct. 23, 2012

(54) LOADING ENTRIES INTO A TLB IN HARDWARE VIA INDIRECT TLB ENTRIES

(75) Inventors: Timothy H. Heil, Rochester, MN (US); Benjamin Herrenschmidt, Barton (AU); Jon K. Kriegel, Rochester, MN (US); Paul Mackerras, Weston ACT (AU); Andrew H. Wottreng, Brainerd, MN (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 12/548,213

(22) Filed: Aug. 26, 2009

(65) Prior Publication Data
US 2010/0058026 A1 Mar. 4, 2010

Related U.S. Application Data

(60) Provisional application No. 61/092,288, filed on Aug. 27, 2008.

(51) Int. Cl.
*G06F 12/00* (2006.01)
(52) U.S. Cl. ........................................ 711/207
(58) Field of Classification Search .................... None
See application file for complete search history.

(56) References Cited

U.S. PATENT DOCUMENTS

| 5,426,750 | A | | 6/1995 | Becker et al. | |
|---|---|---|---|---|---|
| 5,586,283 | A | * | 12/1996 | Lopez-Aguado et al. | 711/207 |
| 6,430,670 | B1 | * | 8/2002 | Bryg et al. | 711/216 |
| 6,647,468 | B1 | * | 11/2003 | Woodward | 711/147 |
| 2007/0186074 | A1 | * | 8/2007 | Bradford et al. | 711/202 |
| 2009/0006805 | A1 | * | 1/2009 | Anderson et al. | 711/207 |

OTHER PUBLICATIONS

Chang, J. et al., "Object Caching for Performance in Object-Oriented Systems", Oct. 14-16, 1991, IEEE, ICCD '91, pp. 379-385.*
Wu, Michael et al, "Improving TLB Miss Handling with Page Table Pointer Caches", Dec. 12, 1997, 10 pages.

* cited by examiner

*Primary Examiner* — Kevin Ellis
*Assistant Examiner* — Stella Eun
(74) *Attorney, Agent, or Firm* — Matthew J. Bussan (57) ABSTRACT

An enhanced mechanism for loading entries into a translation lookaside buffer (TLB) in hardware via indirect TLB entries. In one embodiment, if no direct TLB entry associated with the given virtual address is found in the TLB, the TLB is checked for an indirect TLB entry associated with the given virtual address. Each indirect TLB entry provides the real address of a page table associated with a specified range of virtual addresses and comprises an array of page table entries. If an indirect TLB entry associated with the given virtual address is found in the TLB, a computed address is generated by combining a real address field from the indirect TLB entry and bits from the given virtual address, a page table entry (PTE) is obtained by reading a word from a memory at the computed address, and the PTE is loaded into the TLB as a direct TLB entry.

15 Claims, 8 Drawing Sheets

LOADING ENTRIES INTO A TLB IN HARDWARE VIA INDIRECT TLB ENTRIES

CROSS-REFERENCE TO RELATED APPLICATIONS

This patent application claims the benefit of U.S. Provisional Application No. 61/092,288, filed Aug. 27, 2008, entitled "LOADING ENTRIES INTO A TLB IN HARDWARE VIA INDIRECT TLB ENTRIES", which is hereby incorporated herein by reference in its entirety.

BACKGROUND OF THE INVENTION

1. Field of Invention

The present invention relates in general to the digital data processing field and, in particular, to loading entries into a translation lookaside buffer (TLB) in hardware via indirect TLB entries, which are loaded into the TLB either by software on demand or by a hardware mechanism that utilizes a hash table in memory.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

Computer systems typically utilize virtual addressing mechanisms that allow the programs of a computer system to behave as if they have access to a large, single storage entity instead of access to multiple, smaller storage entities such as a main memory and a DASD device. Virtual addressing mechanisms are typically accomplished by providing memory management units (MMUs) that translate virtual memory addresses to physical memory addresses (also referred to herein as "real addresses").

A particular physical address may be in main memory or in long-term memory, such as a DASD device. If the physical address of information (e.g., data or instructions) sought is in main memory, the information is accessed and utilized by the computer system. If the physical address of information (e.g., data or instructions) sought is in long-term memory, the information is transferred from the long-term memory (usually in a block referred to as a "page") to main memory where it may be used. This transfer is accomplished under control of the MMU.

In computer systems that utilize virtual addressing mechanisms, the speed at which memory may be accessed depends to a significant extent upon the process required to translate addresses form virtual to physical and then retrieve the information from memory. A basic virtual addressing mechanism creates lookup tables which are stored in main memory. Any virtual address presented to the MMU is compared to the values stored in these tables to determine the physical address to access. There are often several levels of tables, and the comparison (typically involving "walking down" a page table directory structure) takes a great deal of system clock time.

Typically, translation lookaside buffers (TLBs) are utilized to enhance the basic virtual addressing mechanism described above. A TLB is essentially a cache of page table entries mapping virtual addresses to physical addresses. With each memory access, the TLB is presented with a virtual address. If the address hits in the TLB, virtual address translation adds little or no overhead to the memory access. If the address misses in the TLB, a more costly hardware handler or software handler is invoked to load and insert the required page table entry into the TLB so the address will hit in the TLB and the memory access can proceed.

Embedded processors with software loaded TLBs can have poor performance on some workloads. Responsible for this poor performance is the overhead of resolving in software the virtual address translations that aren't cached in the TLB. This is generally why higher end processors provide a hardware mechanism to load translations in the TLB automatically. Such hardware mechanisms, however, tend to be complex and expensive. There are several conventional approaches to hardware loading of virtual address translations. These conventional approaches include: tree structured page tables; hashed page tables; virtual linear page tables; page table pointer caches; and TLBs with both page table pointers and page table entries. Each of these approaches is discussed briefly below.

The tree structured page tables approach uses a tree structure in memory. The root of the tree is identified by a physical address in memory, and bits from the virtual address are used as an index at each level of the tree. One of the drawbacks of this approach is that in order to map a large address space, several levels of tree are necessary (typically at least four levels for a 64-bit processor). Another drawback of this approach is that unless caching is employed, resolving a translation requires one load from memory for each level of the tree. This approach can perform poorly and require complex hardware. Also, the memory required for page tables can be excessive in some situations.

Tree structured page tables can provide good performance on workloads where the access pattern has a high degree of locality, provided that caching and/or prefetching is/are implemented. However, tree structured page tables are generally not suitable for an embedded processor as they require a lot of caching in order to perform well, and the logic required to traverse the tree structure is relatively complex.

Another conventional approach to hardware loading of virtual address translations into TLBs utilizes hashed page tables. This approach has several drawbacks. For example, this approach requires a lot of memory for the hash tables, exhibits generally fairly poor locality and cache behavior, and requires added software complexity to manage the hash tables. Individual entries in the hash tables tend to be larger as they need to replicate part of the virtual address. In the case of PowerPC processors (available from International Business Machines Corporation, Armonk, N.Y.), the type of hash table defined by the architecture requires an additional entity to provide segment information (i.e., a segment table or a segment lookaside buffer) which is expensive and timing sensitive, and thus not suitable for most embedded processor implementations.

Yet another conventional approach to hardware loading of virtual address translations into TLBs utilizes virtual linear page tables. While more suitable than the previous two approaches (i.e., tree structured page tables and hashed page tables) for embedded processors, virtual linear page tables occupy part of the available virtual address space. This can be a serious limitation on 32-bit implementations, for example. While the locality performance is good, this approach tends to fall into pathological scenarios when manipulating large virtual address spaces with random access patterns.

Still another conventional approach to hardware loading of virtual address translations into TLBs utilizes page table pointer caches. This approach is exemplified in Michael Wu and Willy Zwaenepoel, "Improving TLB Miss Handling with Page Table Pointer Caches", Dec. 12, 1997. In accordance with this approach, pointers to page tables are cached in a separate array in the MMU.

Yet still another conventional approach to hardware loading of virtual address translations into TLBs utilizes TLBs with both page table pointers and page table entries. This approach is exemplified by U.S. Pat. No. 5,426,750, issued Jun. 20, 1995 to Robert Becker et al., and entitled "TRANSLATION LOOKASIDE BUFFER APPARATUS AND METHOD WITH INPUT/OUTPUT ENTRIES, PAGE TABLE ENTRIES AND PAGE TABLE POINTERS". In accordance with this approach, pointers to page tables are cached in the TLB, but page table pointers are indexed by their physical or real address, as part of a normal top down page-table walk.

Therefore, a need exists for an enhanced mechanism for providing data protection for loading TLB entries into a TLB in hardware via indirect TLB entries.

SUMMARY OF THE INVENTION

The present invention has two main parts, of which the second part is optional.

The first part of the present invention utilizes a hardware mechanism for loading TLB entries from page table pages referenced by "indirect" entries in the translation lookaside buffer (TLB) itself. The second part of the present invention (which is the optional part) utilizes a hardware mechanism for loading the indirect TLB entries from a hash table in memory.

If the first part of the present invention is implemented without the second part, then the indirect entries are loaded into the TLB by software on demand. The performance characteristics of such a mechanism alone (i.e., the first part without the second part) are similar to the virtual linear page tables, discussed in the background art section above, but without the inconvenience of using up part of the available virtual address space.

The indirect entries are effectively page table page pointers cached in the TLB. Compared to the paper by Wu and Zwaenepoel, discussed in the background art section above, caching the page table page pointers in the same array as the regular translations (as in the present invention) rather than in a separate array eliminates the extra area and power associated with such a separate array. Resources may be shared more freely between indirect TLB entries and regular (referred to herein as "direct") TLB entries, thereby improving performance. For instance, when accesses are very sparse, more indirect TLB entries would be helpful, and this will happen naturally in the TLB in accordance with the preferred embodiments of the present invention.

Compared to the scheme in U.S. Pat. No. 5,426,750, discussed in the background art section above, the present invention requires fewer indirect TLB entries to be cached and does not require a complete top-down traversal when the regular translation is not found. The scheme in the '750 patent requires all levels of the page table tree to be cached in the TLB, while the present invention only requires the bottom level to be in the TLB. This reduces capacity pressure on the TLB and means that only the structure of the bottom layer of the page table is defined in hardware. Furthermore, the indirect TLB entry of the present invention can be found directly as part of the search for the regular translation, while the scheme in the '750 patent still requires a serialized multi-step walk down the page table tree, although this walk will be contained in the TLB since all levels are cached.

The process of looking for an indirect TLB entry in accordance with the first part of the present invention is essentially the same as looking for a regular entry of larger size. Hence, the addition of indirect TLB entries is not complex.

Implementing the second part of the present invention as well as the first part provides improved performance on workloads that access large amount of memory with little locality in the access pattern, at the cost of some extra hardware complexity.

According to the preferred embodiments of the present invention, an enhanced mechanism for loading entries into a translation lookaside buffer (TLB) in hardware via utilizes indirect TLB entries. This enhanced mechanism is the first part of the present invention. If no direct TLB entry associated with the given virtual address is found in the TLB, the TLB is checked for an indirect TLB entry associated with the given virtual address. Each indirect TLB entry provides the real address of a page table associated with a specified range of virtual addresses and comprises an array of page table entries. If an indirect TLB entry associated with the given virtual address is found in the TLB, a computed address is generated by combining a real address field from the indirect TLB entry and bits from the given virtual address, a page table entry (PTE) is obtained by reading a word from a memory at the computed address, and the PTE is loaded into the TLB as a direct TLB entry.

In one embodiment, if no indirect TLB entry associated with a given virtual address is found in the TLB, a TLB exception is reported to an operating system. Then, the operating system loads either a direct TLB entry or an indirect TLB entry covering the given virtual address into the TLB using an interrupt handler.

In another embodiment, if no indirect TLB entry associated with the given virtual address is found in the TLB, a hardware mechanism is utilized for loading an indirect TLB entry covering the given virtual address into the TLB from a hash table residing in memory. This hardware mechanism is the second part of the present invention.

In still other embodiments, the present invention is utilized in a virtualized environment in which multiple guest operating systems are running in partitions controlled by a hypervisor. According to these embodiments, there are two ways in which the facilities provided by the present invention can be virtualized: via a logical-to-real address translation (LRAT) array; or via use of shadow page tables.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1.0 Overview

In accordance with the preferred embodiments of the present invention, an enhanced mechanism for loading entries into a translation lookaside buffer (TLB) in hardware utilizes indirect TLB entries. If no direct TLB entry associated with the given virtual address is found in the TLB, the TLB is checked for an indirect TLB entry associated with the given virtual address. Each indirect TLB entry provides the real address of a page table associated with a specified range of virtual addresses and comprises an array of page table entries. If an indirect TLB entry associated with the given virtual address is found in the TLB, a computed address is generated by combining a real address field from the indirect TLB entry and bits from the given virtual address, a page table entry (PTE) is obtained by reading a word from a memory at the computed address, and the PTE is loaded into the TLB as a direct TLB entry.

In one embodiment, if no indirect TLB entry associated with a given virtual address is found in the TLB, a TLB exception is reported to an operating system. Then, the operating system loads either a direct TLB entry or an indirect TLB entry covering the given virtual address into the TLB using an interrupt handler.

In another embodiment, if no indirect TLB entry associated with the given virtual address is found in the TLB, a hardware mechanism is utilized for loading an indirect TLB entry covering the given virtual address into the TLB from a hash table residing in memory.

In still other embodiments, the present invention is utilized in a virtualized environment in which multiple guest operating systems are running in partitions controlled by a hypervisor. In accordance with these embodiments, there are two ways in which the facilities provided by the present invention can be virtualized: via a logical-to-real address translation (LRAT) array; or via use of shadow page tables.

2.0 Detailed Description

Figure 1:
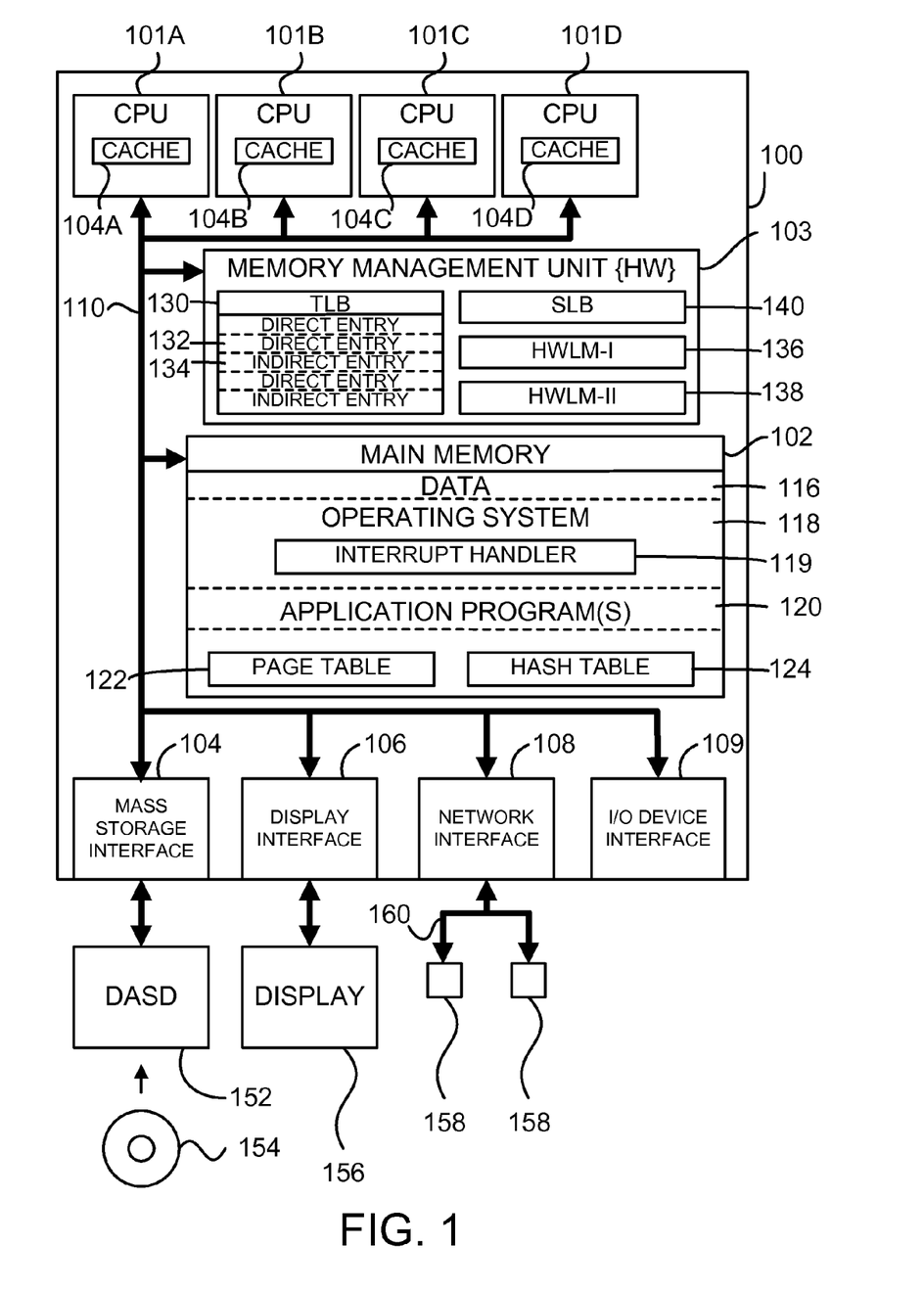
FIG. 1 is a schematic diagram of a computer system for loading entries into a translation lookaside buffer (TLB) in hardware utilizing indirect TLB entries in accordance with the preferred embodiments of the present invention.

A computer system implementation of the preferred embodiments of the present invention will now be described with reference to FIG. 1 in the context of a particular computer system 100, i.e., an IBM System i computer system. However, those skilled in the art will appreciate that the method, apparatus, and computer program product of the present invention apply equally to any computer system, regardless of whether the computer system is a complicated multi-user computing apparatus (e.g., an IBM POWER6 processor-based server system or an IBM POWER6 processor-based blade system residing in an IBM BladeCenter chassis), a single user workstation, a PC, or an embedded control system. As shown in FIG. 1, computer system 100 comprises one or more processors 101A, 101B, 101C and 101D, a main memory 102, a memory management unit (MMU) 103, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 104A, 104B, 104C and 104D (also collectively referred to herein as "caches 104") each associated with a respective one of processors 101A, 101B, 101C and 101D. For example, each of the caches 104 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software (e.g., one or more application programs 120). As illustrated in FIG. 1, the operating system 118 includes an interrupt handler 119. In addition, main memory 102 includes a page table 122, and may optionally contain a hash table 124. Each of these latter elements, which may in various embodiments exist in any number, is described in detail below.

Although the application programs 120, the page table 122 and the hash table 124 are illustrated as being contained within the main memory 102, in other embodiments some or all of them may be on different electronic devices and may be accessed remotely (e.g., via the network 160).

Memory management unit (MMU) 103 in accordance with the preferred embodiments contains at least one translation lookaside buffer (TLB) 130, each of which includes direct TLB entries 132 and indirect TLB entries 134. In lieu of, or in addition to, residing in the memory management unit 103, the translation lookaside buffer may reside in one or more of the processors 101 or elsewhere in the computer system 100. In addition, in accordance with the preferred embodiments of the present invention, the MMU 103 contains a hardware loading mechanism (HWLM-I) 136 for loading direct TLB entries 132 into the TLB 130 via indirect TLB entries 134. The hardware loading mechanism (HWLM-I) 136 implements the first part of the present invention and performs the functions described below with reference to FIGS. 3-5. The HWLM-I 136 carries out these steps in hardware via logic gates and/or other appropriate hardware techniques. One skilled in the art will appreciate, however, that some or all of these functions may be implemented, at least partially, by one or more hardware components residing outside the MMU 103 or via software.

Optionally, the MMU 103 may contain a hardware loading mechanism (HWLM-II) 138 for loading indirect TLB entries 134 into the TLB 130 using one or more hash tables (e.g., hash table 124) in memory. The hardware loading mechanism (HWLM-II) 138 implements the second part of the present invention—the optional part—and performs the functions described below with reference to FIGS. 6-7. One skilled in the art will appreciate, however, that some or all of these functions may be implemented, at least partially, by one or more hardware components residing outside the MMU 103 or via software.

The MMU 103 may also contain a segment lookaside buffer (SLB) 138 for translating effective addresses to virtual addresses in an embodiment, described in detail below, in which indirect TLB entries 134 are loaded into the TLB 130 using a single global hash table (e.g. hash table 124). In lieu of, or in addition to, residing in the memory management unit 103, the segment lookaside buffer may reside in one or more of the processors 101 or elsewhere in the computer system 100. In an alternative embodiment, also described in detail below, the operating system creates one relatively small hash table for each process (in lieu of a single global hash table as in the previous embodiment). In this alternative embodiment, the hardware has a pointer to the current hash table. The pointer is set during a context switch between processes.

Alternatively, in an embodiment that does not utilize the second part of the present invention, the indirect TLB entries 134 may be loaded into the TLB 130 by software on demand. For example, the operating system 118 may load the indirect TLB entries 134 into the TLB 130 utilizing the interrupt handler 119.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, application programs 120, page table 122, and hash table 124, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as IBM i (formerly IBM i5/OS); however, those skilled in the art will appreciate that the spirit and scope of the present invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, memory management unit (MMU) 103, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the present invention is capable of being distributed as an article of manufacture (also referred to herein as a "computer program product") in a variety of forms, and the claims extend to all suitable type of computer-readable media used to actually carry out the distribution, including recordable type media such as floppy disks and CD-ROMs (CD ROM 154 of FIG. 1).

Figure 2:
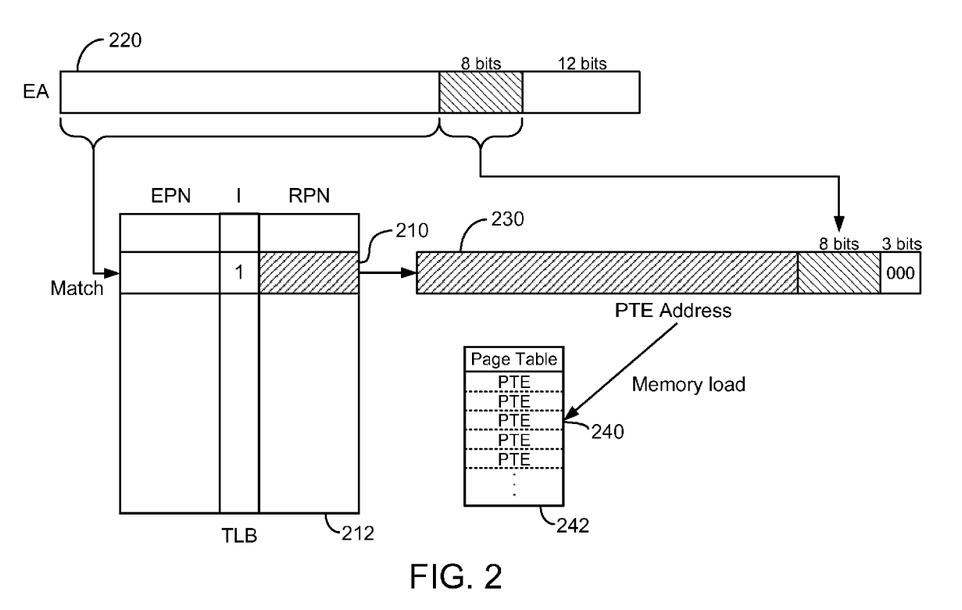
FIG. 2-4 are schematic diagrams respectively illustrating exemplary data structures utilized in successive stages by a hardware mechanism for loading entries into a TLB utilizing indirect TLB entries in accordance with the preferred embodiments of the present invention.
Figure 3:
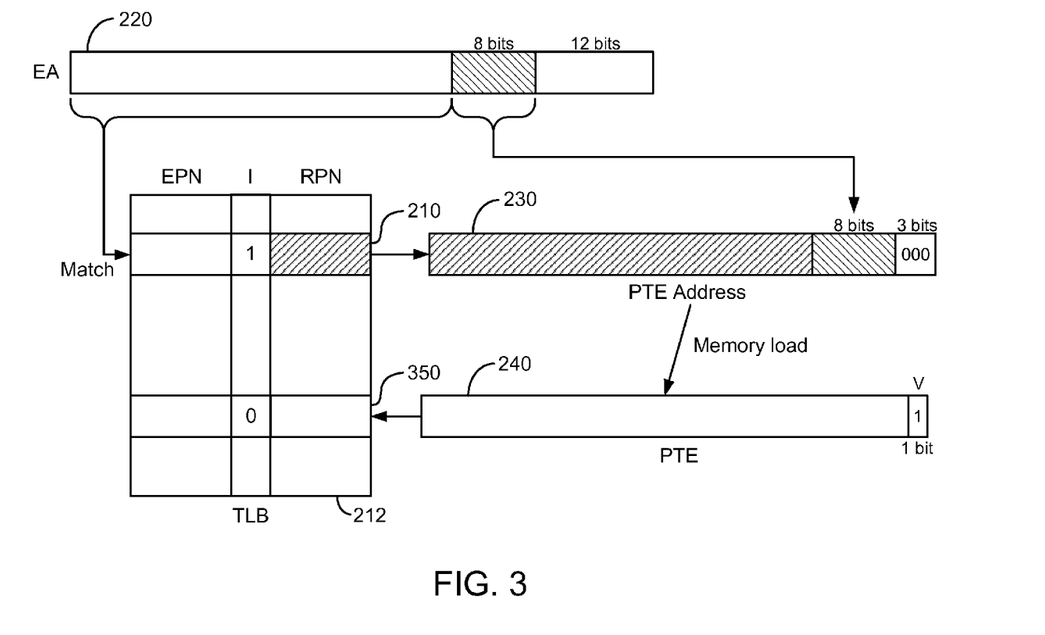
Figure 4:
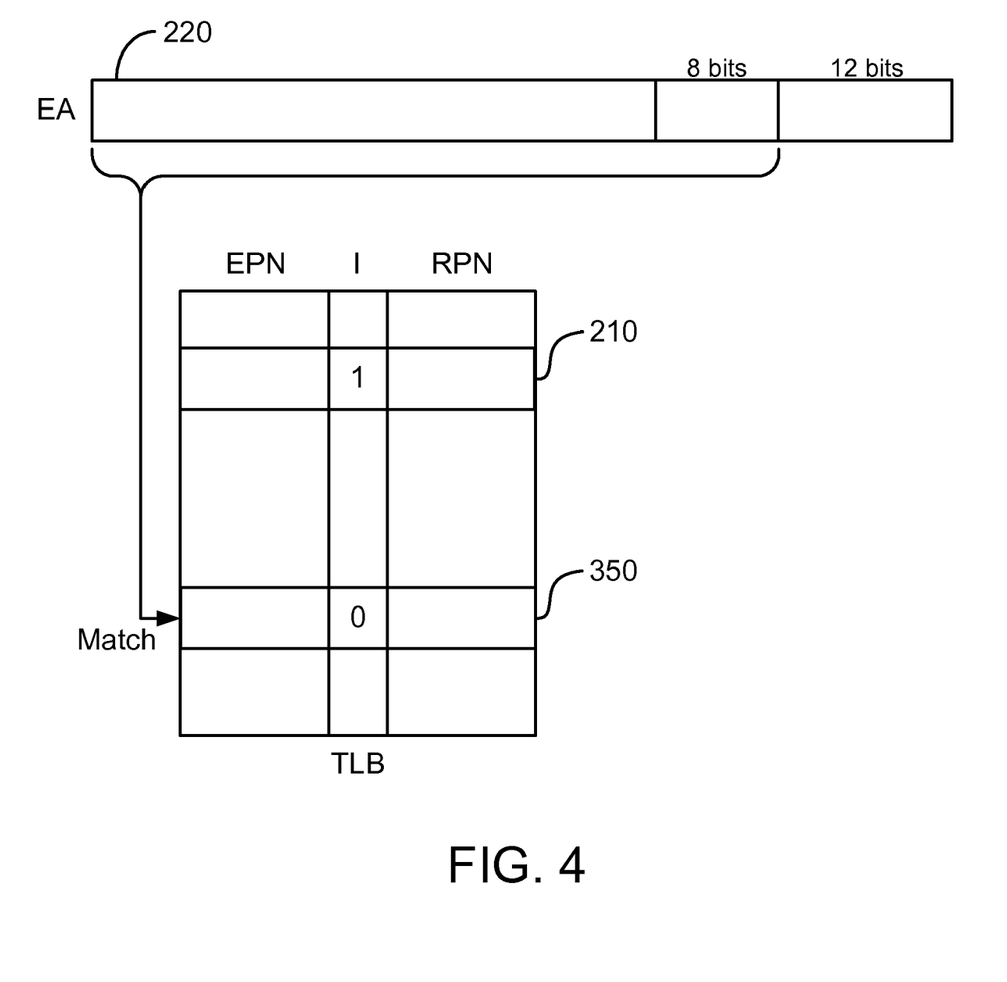

FIG. 2-4 are schematic diagrams respectively illustrating exemplary data structures utilized in successive stages by a hardware mechanism for loading entries into a TLB utilizing indirect TLB entries in accordance with the preferred embodiments of the present invention.

FIG. 2 illustrates successive stages in which a matching indirect TLB entry 210 in a TLB 212 is found for a virtual address 220 (referred to herein as an "EA" or effective address of storage access, which is terminology used in PowerPC implementations), a PTE address 230 is then computed, and a PTE 240 in a page table 242 is loaded from memory using the computed PTE address 230. Each of the stages illustrated in FIG. 2 is further described below.

As illustrated in FIGS. 2-4, in accordance with the preferred embodiments of the present invention, each TLB entry (e.g., indirect TLB 210) in the TLB 212 includes virtual address field (denoted as an effective page number (EPN) field in FIGS. 2-4), a 1-bit "indirect" (I) field indicating whether the entry is direct or indirect, and a real address field (denoted as a real page number (RPN) field in FIGS. 2-4). The EPN field and the RPN field in the TLB are conventional in PowerPC implementations.

FIG. 3 illustrates a subsequent stage (i.e., a stage that occurs after those shown in FIG. 2) in which a new direct TLB entry 350 is created from the PTE 240. The stage illustrated in FIG. 3 is further described below. As illustrated in FIG. 3, in accordance with the preferred embodiments of the present invention, the PTE 240 includes a one-bit "valid" (V) field indicating whether the PTE is valid or invalid.

FIG. 4 illustrates a subsequent stage (i.e., a stage that occurs after those shown in FIG. 3) in which the new direct TLB entry 350 is used to translate the virtual address 220. The stage illustrated in FIG. 4 is further described below.

In accordance with the preferred embodiments of the present invention, the TLB 210 supports multiple page sizes. Alternatively, the present invention may employ multiple TLBs supporting different page sizes. Also, in accordance with the preferred embodiments of the present invention, each TLB entry maps a contiguous region of virtual address space specified by its base address and size. The size is a power of two chosen form a set of supported page sizes, and the address is a multiple of the size.

The purpose of an indirect TLB entry is to provide the real address of a page table (an array of page table entries) associated with a specific range of virtual addresses. This is implemented by having the TLB support a page size that is suitable for the amount of virtual space mapped by all the page entries in one page table, along with a bit in each TLB entry specifying whether the entry is an indirect entry or a normal (direct) entry. This is the "indirect" (I) field shown in FIGS. 2-4, in which a value "1" signifies an indirect TLB entry (e.g., the indirect TLB entry 210 shown in FIGS. 2-4), and in which a value "0" signifies a direct TLB entry (e.g., the direct TLB entry 350 shown in FIGS. 3 and 4). In an indirect TLB entry, the real address field (denoted as "RPN" in FIGS. 2-4) contains the address of the page table page.

A given virtual address can be matched to both a direct and an indirect entry. Normally, the direct entry would be smaller (that is, its page size would be smaller) than the indirect one, as the direct entry would represent a single page within a region mapped by the indirect entry. In that situation, the direct entry is to be used to perform the actual address translation. This is illustrated in FIG. 4. That is, even though the virtual address 220 can be matched to both the indirect TLB entry 210 and the direct TLB entry 350, only the direct TLB 350 is used to translate the virtual address 220.

If an address is matched by an indirect entry but not by any direct entry, then the hardware will load a PTE (Page Table Entry) from memory. In FIG. 2, a predetermined higher-bit portion of the virtual address 220 is matched by the EPN field of indirect TLB entry 210. The PTE is obtained from reading a word from memory at an address computed by combining the real address field in the indirect TLB entry with bits from the virtual address. In FIG. 2, the PTE address 230 is computed by combining the RPN field of the matching indirect TLB entry 210 and a predetermined lower-bit portion (e.g., 8-bits) of the virtual address 220. The computed PTE address 230 may have additional implementation-dependent components as well. For example, in the embodiment illustrated in FIG. 2, the computed PTE address 230 includes a 3-bit field at its tail having the value "000". Also, as illustrated in FIG. 2, the PTE 240 is obtained from reading a word (i.e., the PTE) from memory at the computed PTE address 230.

As noted above, the hardware computes the PTE address by combining the real address field of the matching indirect TLB entry and bits from the virtual address. The higher bits of the PTE address come from the indirect TLB entry's real address field (which points to the page table), and the lower bits of the PTE address come from the virtual address (thus selecting the individual PTE within the page table). In FIG. 2, the higher bits of the PTE address 230 point to page table 242 (i.e., the base address of the page table 242), while the lower bits of the PTE address 230 specifies the individual PTE within the page table 242 (i.e., the offset of the PTE 240 within the page table 242).

Once the PTE is obtained from memory, the entry is determined to be either valid or invalid. Usually there is a single "valid" bit used to indicate this, such as the 1-bit "valid" (V) field in the PTE 240 illustrated in FIG. 3. If the PTE is valid, then a new direct TLB entry is formed and inserted into the TLB. This new direct TLB entry is then used to translate the virtual address (just as for any normal TLB entry). In FIG. 3, because the PTE 240 is found to be valid (i.e., the value is "1" in the V field of the PTE 240), a new direct TLB entry 350 is formed and inserted in the TLB 212. In FIG. 4, the new direct TLB entry in the TLB 212 is used to translate the virtual address 220. If the PTE is invalid, then the translation fails and an exception is generated and reported to the operating system.

Precisely which bits of the virtual address are used to form the address of the PTE depends on the size of the virtual region covered by the indirect TLB entry and the page size assumed for each PTE. Many combinations are possible, and an implementation might support multiple combinations. The indirect TLB entry may contain a field which encodes the assumed page size for each PTE (such a field is necessary if the implementation supports more than one assumed page size for a given indirect TLB entry size).

The PTE may have a page size field that encodes how much virtual space the entry actually covers. This may be the same as or larger than the assumed page size, but should be smaller than the indirect TLB entry size.

If an address is matched neither by a direct entry nor an indirect entry, then the translation fails and a TLB miss exception is reported to the operating system. The operating system may install either a direct entry or an indirect entry covering the virtual address, or may take some other action. Handling a TLB miss by utilizing software is discussed below with reference to FIG. 5. On the other hand, handling a TLB miss utilizing a hardware mechanism (HWLM-II) is discussed below with reference to FIGS. 6 and 7.

Figure 5:
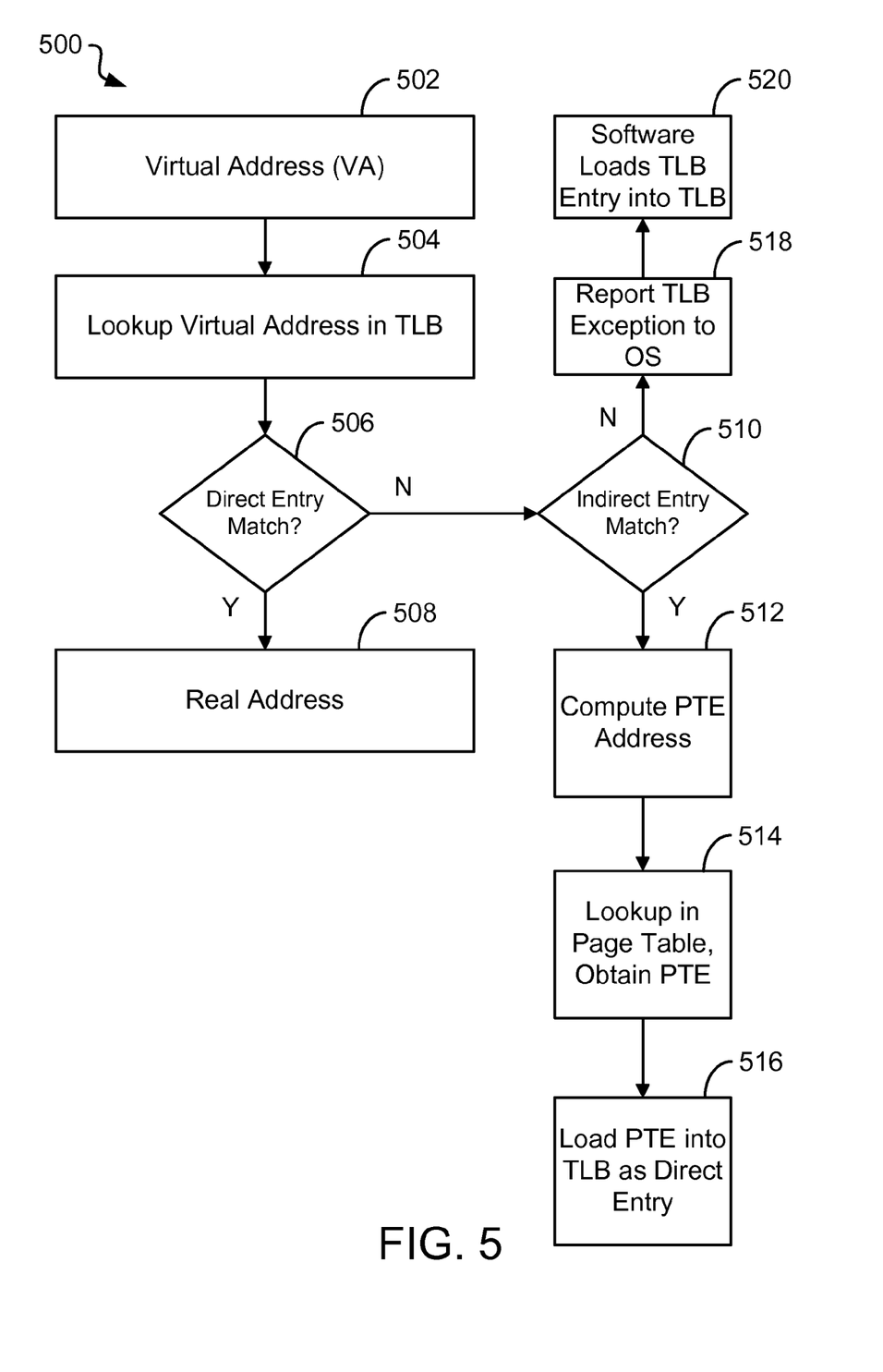
FIG. 5 is a flow diagram illustrating a method for loading entries into a TLB in hardware utilizing indirect TLB entries in accordance with the preferred embodiments of the present invention. In the method illustrated in FIG. 5, indirect TLB entries are loaded into the TLB by software on demand.

FIG. 5 is a flow diagram illustrating a method 500 for loading entries into a TLB in hardware utilizing indirect TLB entries in accordance with the preferred embodiments of the present invention. In the method 500 illustrated in FIG. 5, indirect TLB entries are loaded into the TLB by software on demand.

In method 500, the steps discussed below (steps 502-520) are performed. These steps are set forth in their preferred order. It must be understood, however, that the various steps may occur at different times relative to one another than shown, or may occur simultaneously. Moreover, one skilled in the art will appreciate that one or more of the steps may be omitted.

The method 500 begins with the MMU being presented with a virtual address for translation (step 502). The method 500 continues with a search of the TLB for a match with respect to the virtual address (step 504). Next, the MMU determines if a direct TLB entry matches the virtual address (step 506). If a direct TLB entry matches the virtual address (step 506=Yes), then the matching direct TLB entry is used to translate the virtual address to a real address (step 508).

On the other hand, if the MMU determines that no direct TLB entry matches the virtual address (step 506=No), then the MMU determines if an indirect TLB entry matches the virtual address (step 510). If an indirect TLB entry matches the virtual address (step 510=Yes), then a PTE address is computed by combining a real address field from the matching indirect TLB entry and bits from the virtual address (step 512). Then, a PTE is obtained by reading a word from a memory at the computed PTE address (step 514). The MMU hardware then loads the PTE into the TLB as a new direct TLB entry (step 516). This new TLB entry is used to translate the virtual address to a real address.

If, on the other hand, the MMU determines that no indirect TLB entry matches the virtual address (step 510=No), then the translation fails and a TLB miss exception is reported to the operating system (step 518). The operating system then installs either a direct entry or an indirect entry covering the virtual address (step 520).

Figure 6:
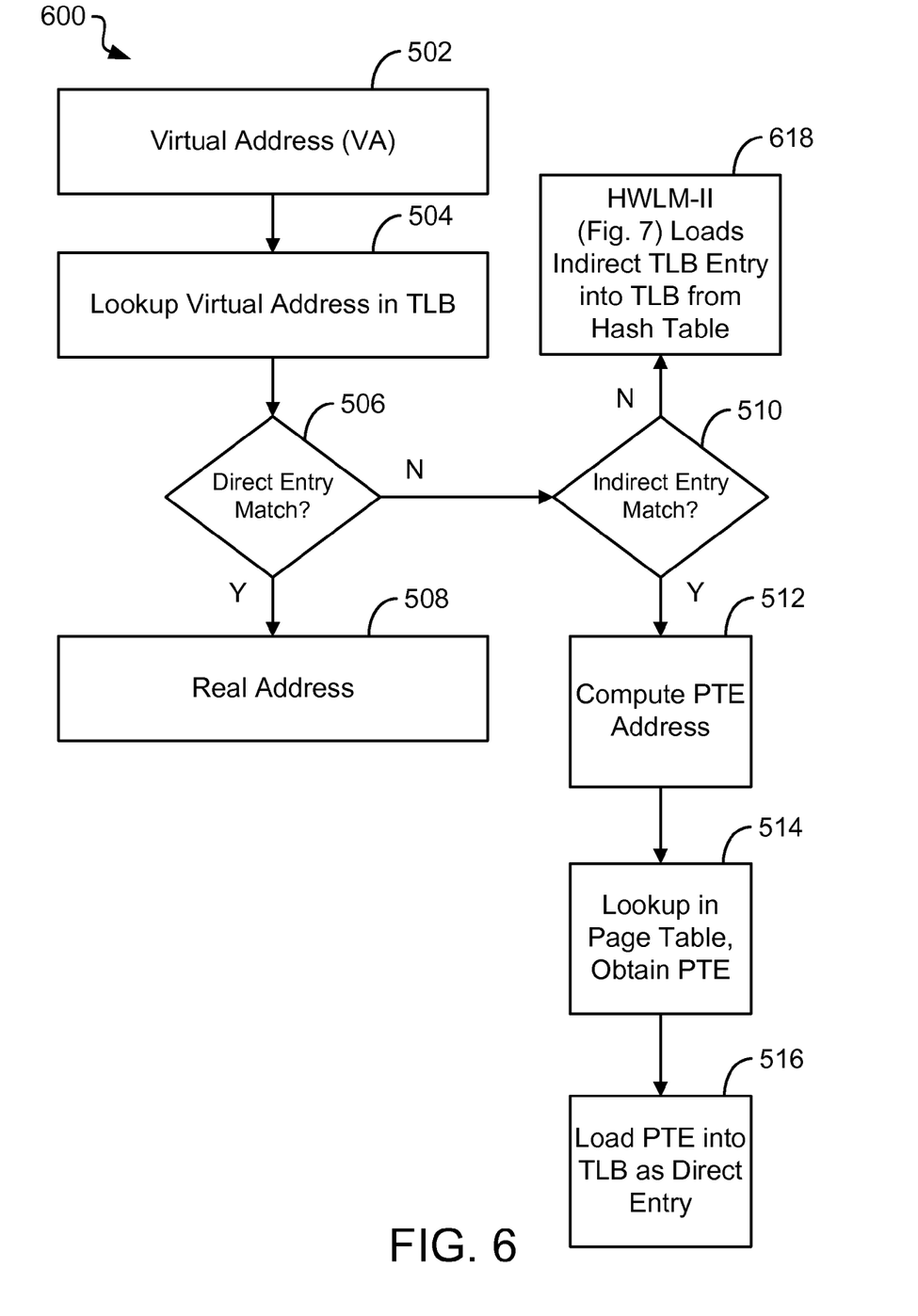
FIG. 6 is a flow diagram illustrating a method for loading entries into a TLB in hardware utilizing indirect TLB entries in accordance with the preferred embodiments of the present invention. In the method illustrated in FIG. 6, a hardware mechanism loads indirect TLB entries into the TLB from a hash table.

FIG. 6 is a flow diagram illustrating a method 600 for loading entries into a TLB in hardware utilizing indirect TLB entries in accordance with the preferred embodiments of the present invention. The method 600 shown in FIG. 6 is identical to the method 500 shown in FIG. 5 except that in the method 600 shown in FIG. 6, a hardware mechanism loads indirect TLB entries into the TLB from a hash table (step 618). This hardware mechanism (HWLM-II)—the second part of the invention—is described in detail below with reference to FIG. 7

For some programs, the number of indirect entries that would needed to map the working set of the program will be larger than the number that can be held in the TLB. With just the first part of the present invention implemented, software will need to handle an interrupt and insert a suitable indirect entry every time the program accesses a location that is not mapped by either a direct entry or indirect entry, and the time taken to do this can become a significant factor limiting performance. The second part of the present invention solves this problem by adding the ability for hardware to load indirect TLB entries from a hash table (e.g., the hash table 124 shown in FIG. 1). Even a relatively small hash table can store many more indirect entries than can be stored in the TLB.

Two exemplary organizations for the hash table are described below in accordance with the preferred embodiments of the present invention. One skilled in the art will appreciate, however, that other organizations for the hash table are possible within the spirit and scope of the present invention.

A first hash table organization in accordance with the preferred embodiments of the present invention uses a relatively small hash table per process, with one specific indirect TLB entry size used in performing the hashing. That is, in this form of the present invention, only one size of indirect TLB entry can be loaded from a given hash table, although different hash tables (corresponding to different software processes in the operating system) may have different indirect entry sizes. Also, in this form of the present invention, the operating system creates one hash table for each process. A process is an instance of a computer program (e.g., the application program 120 in FIG. 1) that is executed in a computer system (e.g. the computer system 100 in FIG. 1) having a multitasking operating system (e.g., the operating system 118 in FIG. 1) which provides the ability to run several programs concurrently. The hardware has a pointer to the current hash table, which is set during a context switch between processes. Such a pointer may be set in a register, for example.

A second hash table organization in accordance with the preferred embodiments of the present invention uses a single global hash table, which is preceded by a translation step using a segment lookaside buffer (SLB). For example, the SLB may translate effective addresses (EAs) to virtual addresses (VAs) in the conventional manner utilized by the Power MMU (available from International Business Machines Corporation, Armonk, N.Y.). This form of the present invention can accommodate multiple different indirect entry sizes because the SLB entry can specify the indirect entry size (the page size) for each segment. In this form, this part of the present invention could in fact be implemented as part of the Power MMU.

Figure 7:
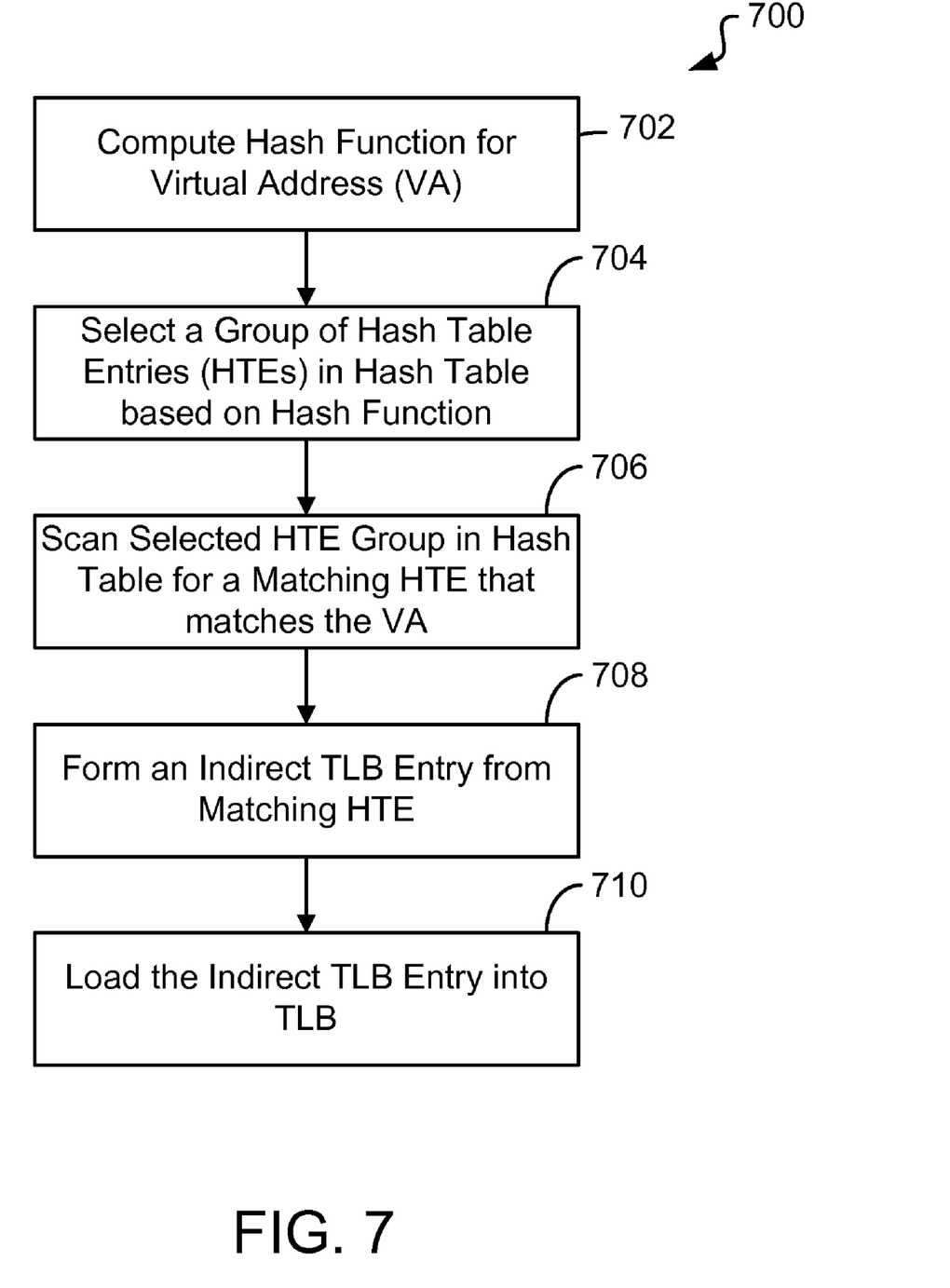
FIG. 7 is a flow diagram illustrating a method for loading indirect TLB entries into a TLB in hardware utilizing a hash table in accordance with the preferred embodiments of the present invention.

FIG. 7 is a flow diagram illustrating a method 700 for loading indirect TLB entries into a TLB in hardware utilizing a hash table in accordance with the preferred embodiments of the present invention. The method 700 is used for either of the two hash table organizations described above.

In method 700, the steps discussed below (steps 702-710) are performed. These steps are set forth in their preferred order. It must be understood, however, that the various steps may occur at different times relative to one another than shown, or may occur simultaneously. Moreover, one skilled in the art will appreciate that one or more of the steps may be omitted.

The method 700 begins with the MMU taking the virtual address and computing a hash function from it (step 702). This step corresponds to the beginning of step 618 in FIG. 6 and is preceded by the determination that the TLB contains neither a direct nor an indirect entry for the given virtual address (step 506=No and step 510=No in FIG. 6). In accordance with the preferred embodiments of the present invention, the hash table is composed of hash table entries (HTEs) which are grouped into groups of a fixed number of entries. Next, the method 700 continues with the hash function being used to select one group of HTEs in the hash table (step 704). The entries in the selected group are then scanned for an individual hash table entry that matches the given virtual address (step 706). If a match is found, an indirect TLB entry is formed from the matching HTE (step 708). Then, the indirect TLB entry is inserted into the TLB (step 710). Resolution of the address proceeds as described in the first part of the present invention.

For the second hash table organization, described above, the hash function is computed in the standard manner as for the Power MMU. For the first hash table organization, described above, the upper bits of the address are taken (corresponding to the address divided by the indirect entry size for the hash table, discarding any remainder). The hash function can be formed from those bits using various techniques, but one common exemplary technique would be to XOR together bit fields, as that technique is reasonably effective and easy to implement in hardware.

Modern processors typically provide support for virtualization, that is, for multiple operating systems (guests) running in partitions controlled by a hypervisor. While the present invention does not directly provide any virtualization functions, it is useful to consider how the present invention would be used in a virtualized environment.

Figure 8:
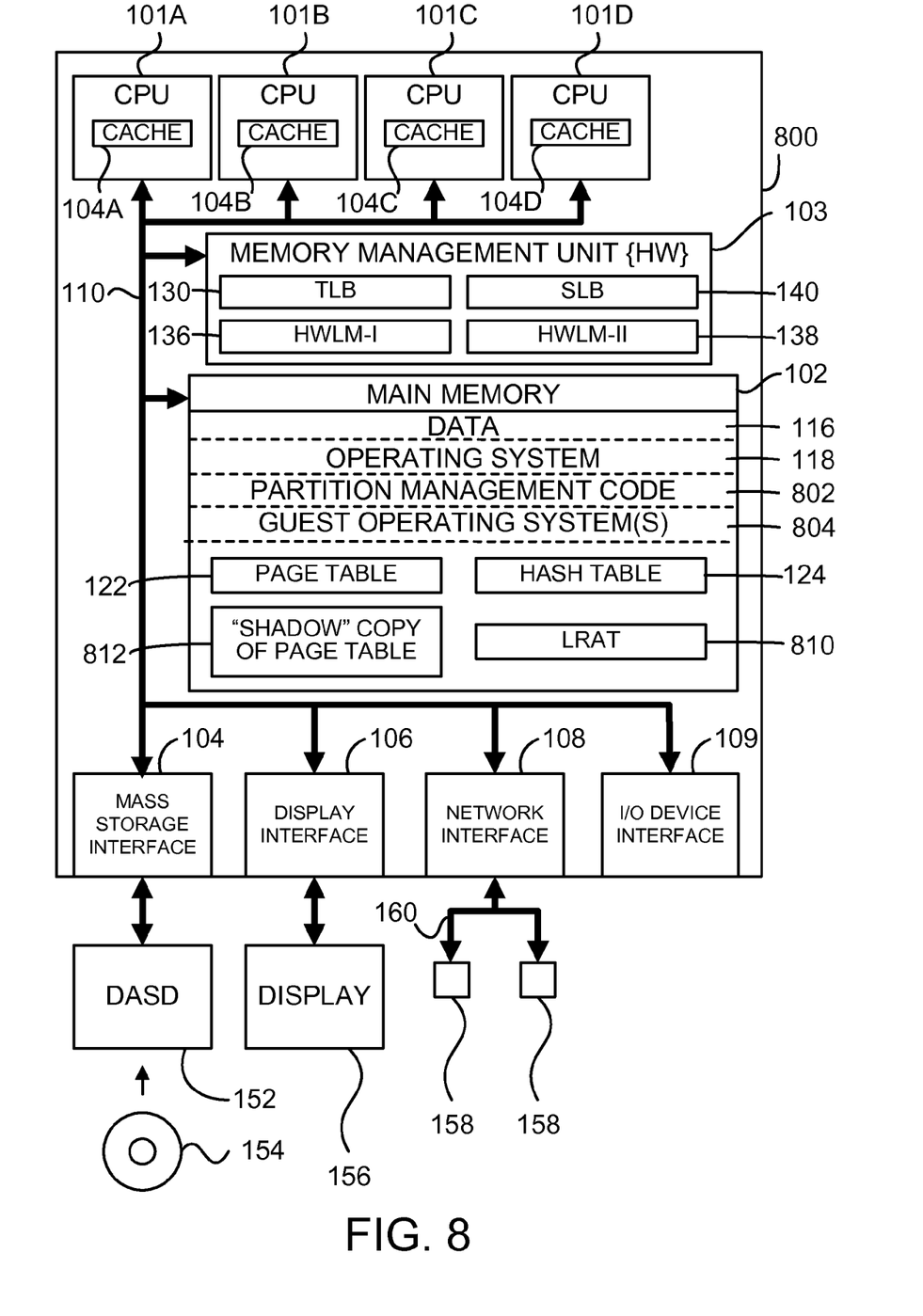
FIG. 8 is a schematic diagram of a computer system, which provides a virtualized environment, for loading entries into a translation lookaside buffer (TLB) in hardware utilizing indirect TLB entries in accordance with the preferred embodiments of the present invention.

FIG. 8 is a schematic diagram of a computer system 800, which provides a virtualized environment, for loading entries into a translation lookaside buffer (TLB) in hardware utilizing indirect TLB entries in accordance with the preferred embodiments of the present invention. The computer system 800 in FIG. 8 generally corresponds to the computer system 100 in FIG. 1 except that the computer apparatus 800 in FIG. 8 provides the facilities of the present invention in a virtualized environment. Accordingly, the main memory 102 of computer system 800, as illustrated in FIG. 8, additionally includes partition management code 802 and one or more guest operating system(s) 804.

The partition management code 802 represents any code that is responsible for performing multipartitioning functions and services for partitions in the computer system 800. The partition management code 802 may be, for example, a "hypervisor", which is available from International Business Machines Corporation, Armonk, N.Y.

While the partition management code 802 is shown in FIG. 8 as a separate entity in memory, the partition management code 802 may be implemented within the operating system 118 or other types of software. For example, the partition management code 802 may be a layer of the operating system 118 responsible for performing multipartitioning functions.

The partition management code 802 may comprise computer executable instructions maintained, for example, as a computer program product stored on a hard disk (e.g., on a DASD device 152) or system firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Also, the partition management code 802 may be implemented in hardware via logic gates and/or other appropriate hardware techniques in lieu of, or in addition to, a processor-based system.

The operating system (OS) 118, which is located in a single partition, is preferably designed to interface with open firmware, such as partition management firmware (e.g., a hypervisor). As described earlier, the operating system 118 is a multitasking operating system known in the industry as IBM i (formerly IBM i5/OS); however, those skilled in the art will appreciate that the spirit and scope of the present invention is not limited to any one operating system. The one or more guest operating system(s) 804 are each located in a separate partition. Each guest operating system (guest OS) 804 may comprise any suitable operating system.

There are two ways in which the facilities provided by the present invention can be virtualized: via a logical-to-real address translation (LRAT) array or via the use of shadow page tables. Accordingly, as illustrated in FIG. 8, the main memory 102 may additionally contain a LRAT 810 or one or more shadow page table(s) 812.

With the LRAT 810, it is possible for the hypervisor 802 to allow the guest operating system 804 to insert indirect entries without hypervisor intervention, either into the TLB 130 directly or into a hash table 124. When an indirect entry is inserted into the TLB 130, the address of the page table 122 is translated via the LRAT 810 to a real address, so that the indirect entry in the TLB 130 contains the real address of the page table 122. In this mode of operation, when a PTE is read from memory, the logical address contained in the RPN field is translated into a real address via the LRAT so that the resulting TLB entry contains the real address of the page. Whenever a logical address is translated via the LRAT to a real address, there is a possibility of an LRAT miss (i.e., the LRAT does not contain a translation for the given logical address), and in that case the translation attempt is aborted and the processor traps to the hypervisor.

With the shadow page tables 812, the TLB 130 is entirely under hypervisor control. Whenever the guest operation system 804 wants to insert an indirect entry in the TLB 130, it has to call the hypervisor 802 to do that. The hypervisor 802 then makes a copy 812 (a "shadow" copy) of the page table 122 set up by the guest operating system 804 in which the RPN field of each PTE contains a real address rather than a logical address (as in the guest OS's copy of the page table 122). This requires the hypervisor to allocate memory for the shadow copy 812 and to scan the guest OS's copy of the page table 122. The hypervisor then inserts an indirect TLB entry that points to its shadow copy 812 (which is inaccessible to the guest OS) rather than the guest OS's copy of the page table 122. This scheme requires the guest OS to call the hypervisor whenever a translation is invalidated. The guest OS can add translations to its copy of the page table 122 without informing the hypervisor 802, as long as the hypervisor 802 checks the OS's copy of the page table 122 whenever an interrupt occurs due to an access to an address for which the corresponding PTE is invalid.

One skilled in the art will appreciate that many variations are possible within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method for loading entries into a translation lookaside buffer (TLB) residing in hardware via indirect TLB entries, comprising the steps of:

checking the TLB for a direct TLB entry associated with a given virtual address, wherein each direct TLB entry contained in the TLB provides a real address associated with a virtual address;

if no direct TLB entry associated with the given virtual address is found in the TLB, checking the TLB for an indirect TLB entry associated with the given virtual address, wherein each indirect TLB entry contained in the TLB provides the real address of a page table associated with a specified range of virtual addresses, each page table being comprised of an array of page table entries;

if an indirect TLB entry associated with the given virtual address is found in the TLB, generating a computed address by combining a real address field from the indirect TLB entry and bits from the given virtual address, obtaining a page table entry (PTE) by reading a word from a memory at the computed address, and loading the PTE into the TLB as a direct TLB entry;

if no indirect TLB entry associated with the given virtual address is found in the TLB, utilizing a hardware mechanism for loading an indirect TLB entry covering the given virtual address into the TLB from a hash table residing in memory, wherein the step of utilizing a hardware mechanism for loading the indirect TLB entry covering the given virtual address into the TLB from the hash table residing in memory comprises the steps of:
   computing, in a memory management unit (MMU), a hash function from the given virtual address;
   selecting a group of hash table entries (HTEs) in the hash table based on the hash function;
   scanning the selected group of HTEs for a matching HTE that matches the given virtual address;
   forming an indirect TLB entry from the matching HTE;
   loading the indirect TLB entry into the TLB.

2. The computer-implemented method as recited in claim 1, wherein each TLB entry contains an "indirect" field having a value identifying the TLB entry as a direct TLB entry or an indirect TLB entry.

3. The computer-implemented method as recited in claim 2, wherein each TLB entry contains a virtual address field and a real address field, and maps a contiguous region of virtual address space specified by a base address and a size, wherein the size is a power of two chosen from a set of one or more page sizes supported by the TLB, and wherein the address is a multiple of the size.

4. The computer-implemented method as recited in claim 3, wherein the real address field in each indirect TLB entry contains the address of a page table page.

5. The computer-implemented method as recited in claim 4, wherein each PTE in the page table has a "valid" field having a value indicating whether the PTE is valid or invalid, and the computer-implemented method further comprising the step of:
   determining whether the PTE obtained by reading the word from the memory at the computed address is valid by checking the "valid" field of the PTE before loading the PTE into the TLB as a direct TLB entry.

6. The computer-implemented method as recited in claim 1, further comprising the steps of:
   creating one hash table for each of one or more processes, wherein each hash table is composed of HTEs grouped into groups of a fixed number of HTEs, and wherein only one size of indirect TLB entry is loaded from a given hash table;
   during a context switch between processes, setting a pointer in hardware to the current hash table.

7. The computer-implemented method as recited in claim 1, further comprising the steps of:
   translating effective addresses to virtual addresses via a segment lookaside buffer (SLB);
   creating a single global hash table upon completing the translating step, wherein the global hash table is composed of HTEs grouped into groups of a fixed number of HTEs.

8. The computer-implemented method as recited in claim 1, wherein a plurality of guest operating systems are running in partitions controlled by a hypervisor, the computer-implemented method further comprising the step of:
   one of the guest operating systems inserting an indirect TLB entry without intervention by the hypervisor into either the TLB directly or a hash table, wherein the address of a page table set up by the guest operating system is translated via a logical-to-real address translation (LRAT) array to a real address so that the indirect TLB entry contains the real address of the page table.

9. The computer-implemented method as recited in claim 1, wherein a plurality of guest operating systems are running in partitions controlled by a hypervisor, the computer-implemented method further comprising the steps of:
   one of the guest operating systems calls the hypervisor to insert an indirect TLB entry into the TLB;
   the hypervisor makes a shadow copy of a page table set up by the guest operating system, wherein a real address field of each PTE in the shadow copy of the page table contains a real address rather than a logical address contained in the page table set up by the guest operating system;
   the hypervisor inserts an indirect TLB entry into the TLB that points to the shadow copy of the page table.

10. A computer system, comprising:
a processor;
a memory coupled to the processor via a memory management unit (MMU) provided with a translation lookaside buffer (TLB), wherein the MMU implements a hardware mechanism for loading entries into the TLB via indirect TLB entries comprising the steps of:
   checking the TLB for a direct TLB entry associated with a given virtual address, wherein each direct TLB entry contained in the TLB provides a real address associated with a virtual address;
   if no direct TLB entry associated with the given virtual address is found in the TLB, checking the TLB for an indirect TLB entry associated with the given virtual address, wherein each indirect TLB entry contained in the TLB provides the real address of a page table associated with a specified range of virtual addresses, each page table being comprised of an array of page table entries;
   if an indirect TLB entry associated with the given virtual address is found in the TLB, generating a computed address by combining a real address field from the indirect TLB entry and bits from the given virtual address, obtaining a page table entry (PTE) by reading a word from the memory at the computed address, and loading the PTE into the TLB as a direct TLB entry;
   if no indirect TLB entry associated with the given virtual address is found in the TLB, the MMU implements a hardware mechanism for loading an indirect TLB entry covering the given virtual address into the TLB from a hash table residing in the memory comprising the steps of:
      computing a hash function from the given virtual address;
      selecting a group of hash table entries (HTEs) in the hash table based on the hash function;
      scanning the selected group of HTEs for a matching HTE that matches the given virtual address;
      forming an indirect TLB entry from the matching HTE;
      loading the indirect TLB entry into the TLB.

11. The computer system as recited in claim 10, wherein each TLB entry contains a virtual address field and a real address field, and maps a contiguous region of virtual address space specified by a base address and a size, wherein the size is a power of two chosen from a set of one or more page sizes supported by the TLB, and wherein the address is a multiple of the size.

12. The computer system as recited in claim 11, wherein the real address field in each indirect TLB entry contains the address of a page table page.

13. The computer system as recited in claim 10, wherein a plurality of guest operating systems are running in partitions controlled by a hypervisor; and wherein one of the guest operating systems inserts an indirect TLB entry without intervention by the hypervisor into either the TLB directly or a hash table, wherein the address of a page table set up by the guest operating system is translated via a logical-to-real address translation (LRAT) array to a real address so that the indirect TLB entry contains the real address of the page table.

14. The computer system as recited in claim 10, wherein a plurality of guest operating systems are running in partitions controlled by a hypervisor; wherein one of the guest operating systems calls the hypervisor to insert an indirect TLB entry into the TLB; wherein the hypervisor makes a shadow copy of a page table set up by the guest operating system, wherein a real address field of each PTE in the shadow copy of the page table contains a real address rather than a logical address contained in the page table set up by the guest operating system; and wherein the hypervisor inserts an indirect TLB entry into the TLB that points to the shadow copy of the page table.

15. A computer program product, comprising:
a plurality of executable instructions provided on a computer readable media, wherein the executable instructions, when executed by a processor in a digital computing device wherein a plurality of guest operating systems are running in partitions controlled by a hypervisor, cause the digital computing device to perform the steps of:
checking a translation lookaside buffer (TLB) for a direct TLB entry associated with a given virtual address, wherein each direct TLB entry contained in the TLB provides a real address associated with a virtual address;
if no direct TLB entry associated with the given virtual address is found in the TLB, checking the TLB for an indirect TLB entry associated with the given virtual address, wherein each indirect TLB entry contained in the TLB provides the real address of a page table associated with a specified range of virtual addresses, each page table being comprised of an array of page table entries;
if an indirect TLB entry associated with the given virtual address is found in the TLB, generating a computed address by combining a real address field from the indirect TLB entry and bits from the given virtual address, obtaining a page table entry (PTE) by reading a word from the memory at the computed address, and loading the PTE into the TLB as a direct TLB entry;
one of the guest operating systems inserting an indirect TLB entry without intervention by the hypervisor into either the TLB directly or a hash table, wherein the address of a page table set up by the guest operating system is translated via a logical-to-real address translation (LRAT) array to a real address so that the indirect TLB entry contains the real address of the page table.

* * * * *